Patented Dec. 8, 1925.

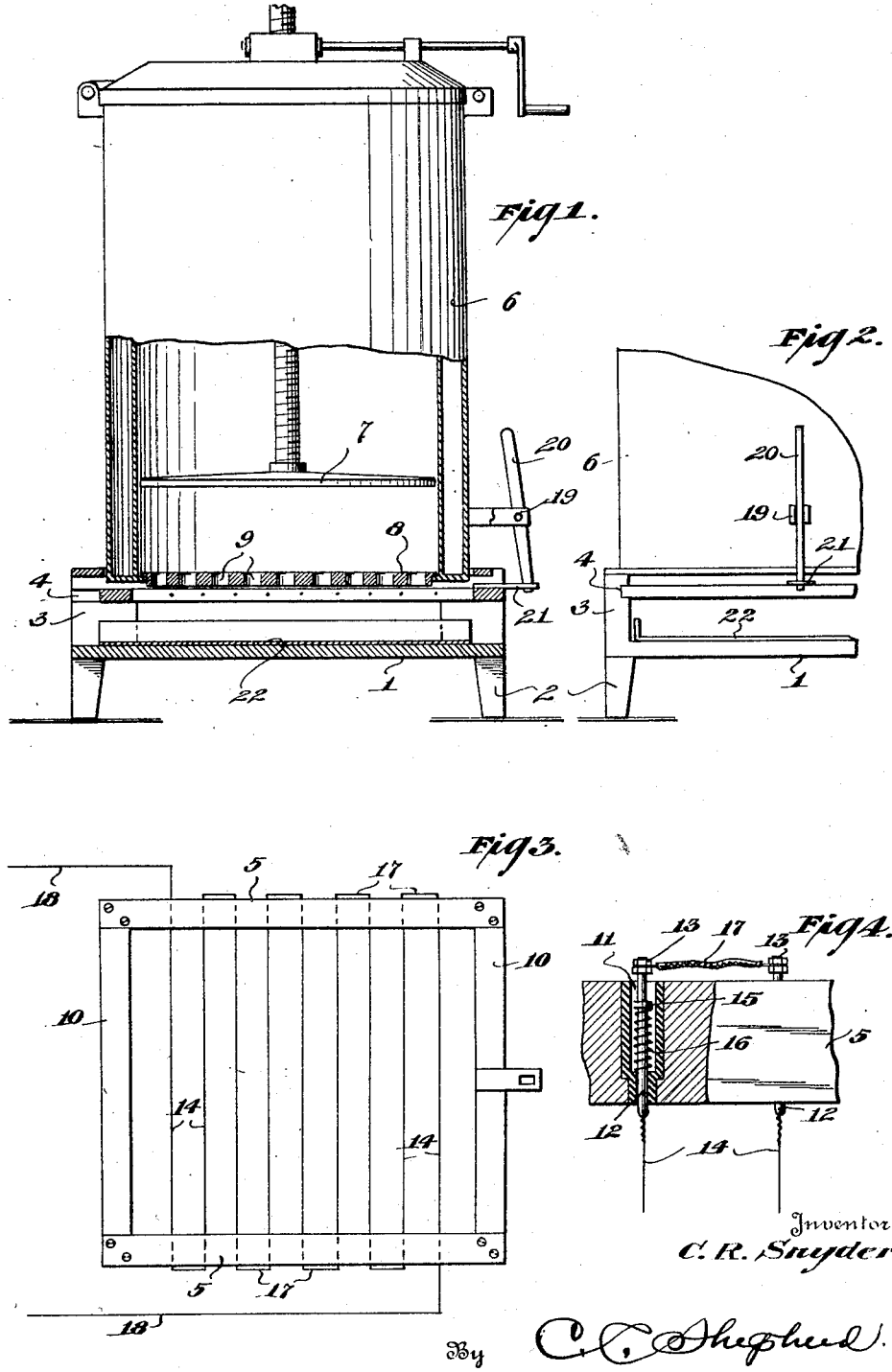

1,564,637

UNITED STATES PATENT OFFICE.

CHARLES RANNEY SNYDER, OF COLUMBUS, OHIO.

APPARATUS FOR FORMING CREAM CENTERS.

Application filed June 20, 1923. Serial No. 646,498.

*To all whom it may concern:*

Be it known that I, CHARLES RANNEY SNYDER, a citizen of the United States, residing at Columbus, in the county of Franklin and State of Ohio, have invented certain new and useful Improvements in Apparatus for Forming Cream Centers, of which the following is a specification.

The present invention is directed to improvements in an apparatus for forming chocolate cream centers and has for its object to provide a device of this character so constructed that the body of material from which the centers are formed can be conveniently cut from a continuous cylindrical mass into the desired sizes for subsequent dipping in chocolate coating.

A further object of the invention is to provide a means for severing the cream bodies in a simple and efficient manner, this being accomplished through the medium of a plurality of wires which are heated electrically so as to more readily sever the cream bodies.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a side elevation, partly in section of the apparatus,

Figure 2 is a fragmentary side elevation,

Figure 3 is a plan view of the cutting device, and

Figure 4 is a sectional view through one of the wire supporting side bars showing the manner in which the wires are supported.

Referring to the drawing 1 designates a base which is supported upon suitable legs 2, said base having its sides 3 provided with guides 4 in which is slidably mounted the side bars of the wire supporting frame 5, the purpose of which will appear later.

Mounted upon the base is a hopper 6 in which is mounted for vertical movement a follower 7, any approved means being used for moving the follower vertically. The bottom of the hopper has removably mounted therein a plate 8, said plate having a plurality of molds 9 formed therein, and it is through these molds that the material to be severed and dipped is pressed to assume cylindrical forms as they leave the hopper.

The side bars 5 hereinbefore mentioned are connected by end bars 10 so that the frame is rectangular in shape. These side bars are provided with sockets 11 in which are mounted pins 12, the outer ends of said pins being provided with binding posts 13 while the inner ends thereof extend slightly inwardly beyond the inner faces of the bars 5 and have connected thereto the current conducting wires 14 which bridge the space between the bars 5. These pins have collars 15 formed integral therewith and encircling the pins are coil springs 16 which serve to normally urge the pins outwardly so that the electric current wires 14 will be under tension. The number of wires may of course be varied as desired and have their binding posts in circuit through the medium of the conducting wires 17, it being of course understood that the electric current will be furnished from any suitable source through the conducting wires 18.

Owing to the presence of the springs 16 it will be obvious that the wires 14 can expand or contract, this being essential since when the wires are energized they will expand and the springs will compensate for this expansion and also for the contraction of the wires when the same are deenergized and are contracting, it being apparent that by this structure the wires will be held taut regardless of their condition. It frequently occurs in machines of this character that when the material is being forced from the molds that the wires for cutting the material, in this instance being the wires 14, do not sever the material evenly and quickly owing to the fact that the wires are cool, but in this structure the wires are electrically heated so that they will easily sever the material as it is expressed from the molds 9.

In order to reciprocate the wire supporting frame a bracket 19 is supported by the hopper and has pivotally connected thereto a hand lever 20 the lower end of which is connected with the bracket 21 fixed to the front part 10 of the wire supporting frame and upon swinging the lever 20 outwardly the frame will be moved in a reverse direction so that the wires 14 will engage the material being expressed from the molds and sever the same, the severed material falling upon the tray 22 removably supported upon the base 1, and after which the severed material can be dipped in the chocolate coating as usual.

What is claimed is:

1. In a machine for forming candy, a hopper having a perforate bottom, a press for forcing candy stock through the perforations in said bottom, a horizontal frame arranged beneath the perforate bottom, spaced electrically heated wires carried by said frame, means for effecting relative movement between said frame and said bottom so that said electrically heated wires may sever the candy stock protruding to the openings in the bottom of said hopper, and means cooperative with said frame and said severing wires for automatically maintaining said wires in a substantially taut condition irrespective of the variable temperatures thereof.

2. An apparatus of the character described comprising a hopper, a bottom for the hopper having a plurality of molds formed therein, means for pressing material from the hopper through said molds, a frame slidably mounted under the bottom of the hopper and including side bars, spring controlled pins mounted in said side bars, said pins being connected by wires, means for furnishing current to the pins and wires, and means for shifting the frame to sever the material passing from the molds when the wires are electically heated.

3. In a candy making machine, a press having a perforate bottom, a plurality of spaced electrically heated cutters and arranged in a plane parallel to said bottom, means for effecting relative movement between the bottom and the cutters for severing the candy stock protruding from the openings in said bottom, and means cooperative with said cutters for maintaining automatically an operative tension thereon irrespective of the varying temperatures prevailing in said cutters.

In testimony whereof I affix my signature.

CHARLES RANNEY SNYDER.